No. 692,256. Patented Feb. 4, 1902.
J. EDWARDS.
WHEEL.
(Application filed Sept. 14, 1899.)
(No Model.)
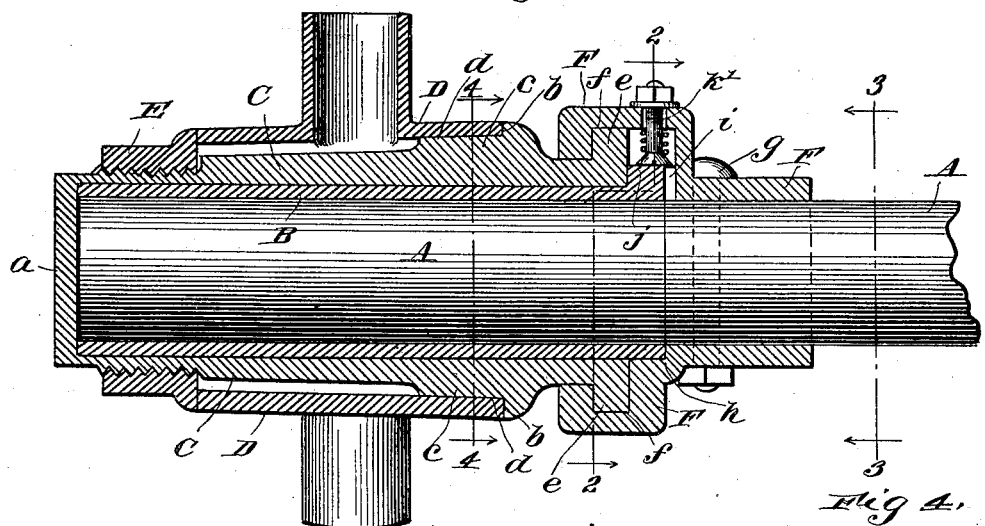
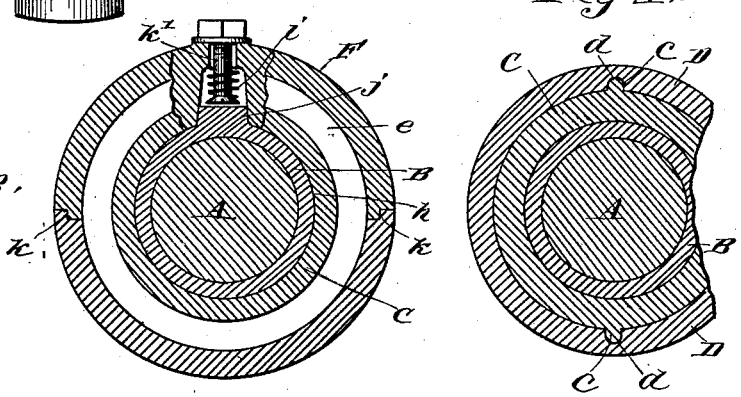
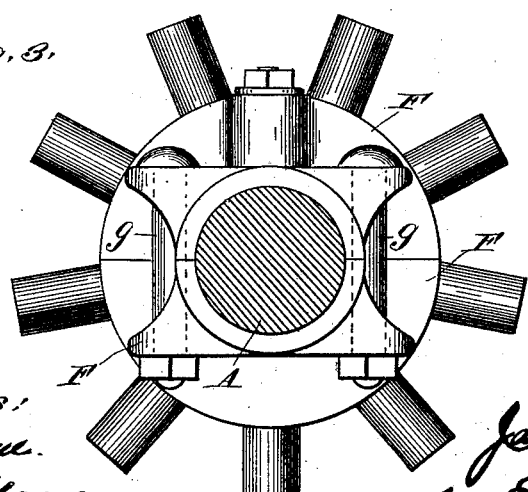
Witnesses:
Inventor:
James Edwards
by Edward Ricker
atty

UNITED STATES PATENT OFFICE.

JAMES EDWARDS, OF PERU, ILLINOIS.

WHEEL.

SPECIFICATION forming part of Letters Patent No. 692,256, dated February 4, 1902.

Application filed September 14, 1899. Serial No. 730,470. (No model.)

*To all whom it may concern:*

Be it known that I, JAMES EDWARDS, a citizen of the United States of America, residing at Peru, in the county of Lasalle, in the State of Illinois, have invented a certain new and useful Improvement in Wheels, of which the following is a description, reference being had to the accompanying drawings, forming part of this specification.

My invention relates more particularly to wheels adapted for use as the furrow-wheels of wheeled plows, although applicable to wheels for other purposes; and it consists in a novel construction, arrangement, and combination of hub, axle-box, bearing-sleeve, axle, and attaching device, whereby the axle is relieved of wear, the bearing protected from dust and dirt, the construction of the parts cheapened, their assemblage facilitated, and their efficiency and durability enhanced, all as hereinafter more fully explained in connection with the accompanying drawings, in which—

Figure 1 represents a middle longitudinal section of a wheel hub and axle and associated parts embodying my invention; and Figs. 2, 3, and 4 transverse sections on the lines 2 2, 3 3, and 4 4 of Fig. 1, respectively.

The same letters of reference are used to designate identical parts in the several views.

A represents the axle-arm, on which fits a sleeve B, held from turning upon the axle by means hereinafter described. Fitting and turning freely upon the sleeve B is the axle-box C, closed at its outer end at $a$, so as to wholly prevent the access of dust and dirt to the outer end of the axle A and sleeve B, which latter is substantially inclosed within the axle-box C, projecting but slightly from the right-hand or inner end of the latter, as shown. The middle portion of the exterior of the axle-box C, upon which fits the hub D of the wheel, is preferably slightly tapered, the tapered portion terminating at its larger inner end in an outwardly-facing annular shoulder $b$, against which fits the inner end of the hub D. Formed upon opposite sides of the box C, in the present instance adjacent the shoulder $b$, are two lugs or short ribs $c$, which fit in internal longitudinal grooves or recesses $d$, formed upon the inner surface of the hub D, Fig. 4, thereby locking the hub to the axle-box and causing the latter to turn with the hub and wheel. The hub is held in place upon the box by a nut or band E, screwed upon the exteriorly-threaded outer end of the box and abutting against the outer end of the hub.

At its extreme inner end the axle-box C is provided with an integral outwardly-projecting flange or collar $e$, which fits within a circumferential groove or recess $f$, formed within a two-part clamping or attaching member F, whose right-hand portion or hub snugly fits the axle-arm A and is firmly clamped thereto by bolts $g$, passed through its two halves on opposite sides of the axle. The extreme inner or right-hand end of the sleeve B abuts against the left-hand end of the hub portion of the attaching member F, the latter being provided with a circular recess $h$ to receive the end of the sleeve B and said recess $h$ being further provided with a radial extension $i$, in which fits a lug $j$ upon the outer surface of the end of the sleeve B, thereby locking the sleeve B to the attaching member F, and consequently to the axle A, so that the sleeve is held from turning upon the axle, as heretofore stated.

The flange or collar $e$ upon the end of the axle-box C is free to turn within the attaching member F, but is substantially inclosed within the latter, and the fit of the parts is sufficiently snug to effectively prevent the entrance of dust and dirt between said collar and attaching member to the bearing parts inclosed within. To guard against the entrance of dirt through the joint at the opposite sides of the portion of the attaching member F which incloses the collar, the two halves of said member are so formed at their joint-surfaces as to fit one within the other, as shown at $k$ in Fig. 2.

An oil-hole is provided in the attaching member at $k'$ and normally closed by a nut and washer upon the upper end of a screw passed outwardly through the hole and concealed within the member F by a coiled spring acting upon the head of the screw to press the latter inward and keep the hole closed to prevent the entrance of dust and dirt.

It will be understood from the foregoing explanation of the construction and arrangement of the parts that the axle-box C turns upon the sleeve B, which is firmly secured to the axle A, and that the latter is therefore subjected to no wear whatever. It results from this that the only wear which occurs is between the inner surface of the axle-box and the outer surface of the sleeve and that whenever this becomes so great as to be objectionable a new sleeve may be readily substituted for the old one at a trifling expense. It will also be understood that owing to the inclosure of the sleeve and outer end of the axle within the axle-box having the closed outer end no dust and dirt can possibly enter between the bearing-surfaces of the axle-box and sleeve at the outer end of the latter, while the bearing-surfaces at the inner end of the axle-box and sleeve are efficiently protected from dust and dirt by the axle-box flange and the circumferential groove or recess of the attaching member. It will be further understood that the wheel is secured upon the axle entirely by the attaching member F, which latter is simply clamped to the axle by means of the bolts, so that it is not necessary to drill the usual hole in the outer end of the axle for receiving the cotter-pin nor to do any other work upon the axle or mutilate it in any way.

Where my improved wheel is used as the furrow-wheel of a wheeled plow, for which purpose it is especially adapted, it will stand at an angle to the surface of the ground, owing to the usual inclination of the axle-arm, and in that event the end thrust between the axle and wheel will be borne by the inner or right-hand wall of the circumferential groove or recess f in the attaching member F, against which wall the extreme right-hand or inner end of the axle-box C will abut and turn.

The advantages of my invention with respect to protection of the bearing-surfaces from dust and dirt and also with respect to attachment of the axle-box and wheel to the axle may be attained without the employment of the bearing-sleeve interposed between the axle and axle-box, the provision of the sleeve merely serving to protect the axle from wear and permit ready renewal of the worn part at small expense, as before explained.

Having thus fully described my invention, I claim—

1. The combination of the bearing-sleeve, the axle-box inclosing the same and adapted to turn thereon, and the two-part attaching member adapted to be clamped to the axle and lock the sleeve thereto, and engaging the axle-box so as to hold the latter in place upon the sleeve and axle but permit it to freely turn upon the sleeve, substantially as described.

2. The combination of the bearing-sleeve, the axle-box fitted to turn thereon and provided at its inner end with the circumferential flange, and the two-part attaching member adapted to be clamped to the axle and lock the sleeve thereto, and provided with the circumferential recess engaging the flange upon the axle-box, substantially as described.

3. The combination of the bearing-sleeve adapted to fit upon the axle, the axle-box inclosing and adapted to turn upon said sleeve and provided at its inner end with a circumferential flange, and provided also near its inner end with an outwardly-facing annular shoulder and near its outer end with exterior screw-threads, the wheel-hub fitting upon said box and abutting at its inner end against said shoulder, the nut or band screwed upon the outer end of the box and engaging the outer end of the wheel-hub, and the two-part attaching member adapted to be clamped to the axle and engaging the sleeve to lock it to the axle and provided with the circumferential groove engaging the flange upon the axle-box, substantially as described.

JAMES EDWARDS.

Witnesses:
PAUL E. BOEHME,
WM. F. HOBERG.